US011312872B2

(12) United States Patent
Ritchie et al.

(10) Patent No.: US 11,312,872 B2
(45) Date of Patent: Apr. 26, 2022

(54) METHOD FOR FORMING OLEOPHOBIC-HYDROPHILIC COATINGS INCLUDING PARTICLES AND/OR NANO-PARTICLES, A COATING FORMED THEREBY AND AN ARTICLE TO WHICH THE COATING IS APPLIED (71) Applicant: University of Durham, Durham (GB)

(72) Inventors: Angus William Ritchie, South Ayrshire (GB); Jas Pal Singh Badyal, Durham (GB)

(73) Assignee: UNIVERSITY OF DURHAM, Durham (GB)

( * ) Notice: Subject to any disclaimer, the term of this patent is extended or adjusted under 35 U.S.C. 154(b) by 287 days.

(21) Appl. No.: 16/349,168

(22) PCT Filed: Nov. 22, 2017

(86) PCT No.: PCT/GB2017/053504
§ 371 (c)(1),
(2) Date: May 10, 2019

(87) PCT Pub. No.: WO2018/096327
PCT Pub. Date: May 31, 2018

(65) Prior Publication Data
US 2019/0284404 A1    Sep. 19, 2019

(30) Foreign Application Priority Data
Nov. 22, 2016 (GB) ....................... 1619696

(51) Int. Cl.
| | |
|---|---|
| *C09D 7/00* | (2018.01) |
| *C09D 7/63* | (2018.01) |
| *C09D 7/80* | (2018.01) |
| *C08K 3/36* | (2006.01) |
| *C09D 5/16* | (2006.01) |
| *C09D 201/04* | (2006.01) |
| *C09D 5/00* | (2006.01) |
| *C08K 3/04* | (2006.01) |
| *C08K 3/22* | (2006.01) |
| *C08K 3/34* | (2006.01) |
| *B05D 5/00* | (2006.01) |

(52) U.S. Cl.
CPC ............... *C09D 7/63* (2018.01); *C08K 3/36* (2013.01); *C09D 5/00* (2013.01); *C09D 5/1681* (2013.01); *C09D 7/80* (2018.01); *C09D 201/04* (2013.01); *B05D 5/00* (2013.01); *B05D 2506/00* (2013.01); *B05D 2601/22* (2013.01); *C08K 3/04* (2013.01); *C08K 3/22* (2013.01); *C08K 3/346* (2013.01); *C08K 2003/2227* (2013.01); *C08K 2003/2296* (2013.01); *C08K 2201/005* (2013.01); *C08K 2201/013* (2013.01)

(58) Field of Classification Search
CPC .......... C09D 7/00; C09D 7/63; C09D 5/1681; C09D 7/80; C08K 3/36; C08K 3/04; C08K 2201/013; C08K 2201/005; C08K 2003/2296; C08K 3/22; C08K 3/346; C08K 2003/2227; B05D 2506/00; B05D 2601/22
USPC .......................................................... 523/205
See application file for complete search history.

(56) References Cited

U.S. PATENT DOCUMENTS

| | | | |
|---|---|---|---|
| 2002/0040098 A1* | 4/2002 | Maekawa ............. | C08L 51/006 525/88 |
| 2006/0017759 A1 | 1/2006 | Matsuzawa et al. | |
| 2010/0152042 A1* | 6/2010 | Do ....................... | B01J 20/0207 502/407 |
| 2013/0171367 A1* | 7/2013 | Kusinski ................ | B05D 5/083 427/447 |
| 2013/0210969 A1 | 8/2013 | Grigoriev et al. | |
| 2014/0292951 A1 | 10/2014 | Ferrar et al. | |
| 2015/0299482 A1 | 10/2015 | Hemmes et al. | |
| 2016/0296866 A1 | 10/2016 | Badyal et al. | |

FOREIGN PATENT DOCUMENTS

| | | |
|---|---|---|
| EP | 2998363 A1 | 3/2016 |
| WO | 9528436 A1 | 10/1995 |

OTHER PUBLICATIONS

University of Durham, "International Preliminary Report on Patentability", in connection with PCT/GB2017/053504 filed Nov. 22, 2017, 12 pages, dated Jun. 6, 2019.

* cited by examiner

*Primary Examiner* — Hannah J Pak
(74) *Attorney, Agent, or Firm* — McKee, Voorhees & Sease, PLC (57) ABSTRACT

The invention to which this application relates is apparatus and a method for applying coatings to improve the ability to provide Oleophobic and/or Hydrophilic surfaces on an item and the coating includes particles and/or nano particles to enhance the performance characteristics of the coating.

16 Claims, 4 Drawing Sheets

_METHOD FOR FORMING OLEOPHOBIC-HYDROPHILIC COATINGS INCLUDING PARTICLES AND/OR NANO-PARTICLES, A COATING FORMED THEREBY AND AN ARTICLE TO WHICH THE COATING IS APPLIED_

CROSS REFERENCE TO RELATED APPLICATIONS

This is a U.S. national phase application claiming priority to PCT/GB2017/053504, filed Nov. 22, 2017, which claims priority to British application No. 1619696.6, filed Nov. 22, 2016, the entire contents of which are hereby incorporated by reference in their entirety.

The invention to which this application relates is apparatus and a method for applying coatings to improve the ability to provide Oleophobic and/or Hydrophilic surfaces on an item.

One problem which is addressed by the current invention is the ability to separate different components from a fluid and to do so in a manner which allows one of the components to be collected and processed separately from at least one of the other components of the fluid. It is known that the separation of oil and water is an important environmental challenge. Existing methods for the removal or collection of oils from an oil-water mixture most typically utilise absorbent materials such as zeolites, organoclays, non-woven polypropylene, or natural fibres (such as straw, cellulose, or wool). However, these materials tend to also absorb water, thereby reducing their efficiency. In addition, further processing steps then need to be performed in order to remove the absorbed oil from the absorbent material. This makes it difficult to incorporate this type of treatment into continuous flow systems which would be preferable on site such as being performed by clean-up vessels.

It is further known to be able to use separation membranes that repel one liquid component whilst allowing another component to pass through the same. Typically, these membranes are made out of hydrophobic and oleophilic materials so that water can run off the surface whilst oil is allowed to permeate through the membrane. However a problem with the use of this form of membrane is that surface contamination of the membrane by the oil culminates in a drop in the efficiency of the separation which is achieved.

It is yet further known to utilise articles with oleophobic-hydrophilic surfaces which allow, for example, oil and oil-based contaminants to be repelled by the surface coating and allows the water component to pass through the same.

The applicant, in their co-pending application EP3071654 discloses a coating and a method for forming the same which can be utilised in the provision of advantageous improvements to coatings of this type for a range of applications by forming and providing a coating which has an oleophobic-hydrophilic switching parameter (the difference in measured static contact angle between oil and water droplets)magnitude of at least 60° and/or a switching speed of less than 10 seconds.

It is also known from the paper in the Journal of Materials Chemistry 2012, 22, 2834 entitled "Superhydrophilic-Superoleophobic Coatings" by Jin Yang, Zhaozhu Zhang, Xianghui Xu, Xiaotao Zhu, Xuehu Men and Xiaoyan Zhou to provide coatings which include nano particles and in this paper the method of forming the same includes the utilisation of an additional plasma treatment step to be performed in order to make the surfaces wet by water more quickly.

A further method for forming a coating including nano particles, is defined in the paper "Mechanically durable, superoleophobic coatings prepared by layer-by-layer technique for anti-smudge and oil-water separation". By: Brown, Philip S.; Bhushan, Bharat, SCIENTIFIC REPORTS Volume: 5 Article Number: 8701 Published: 2015. In this document there is disclosed a method which requires a series of steps to be performed to form four layers. Each layer is required to be deposited separately each of which requires a separate procedure and the process as a whole is relatively complex and time consuming, for example, after the third layer has been deposited, the substrate with the partially completed coating has to be treated in an oven operating at 140° C. for 1 hour. This makes the method unsuitable and unattractive for commercial scale implementation.

An aim of the present invention is therefore to provide a method, and a coating formed thereby, which allows the provision of particles and/or nano-particles to be selectively provided as part thereof, and thereby an improved coating which can be formed in an efficient and commercially viable manner whilst, at the same time providing the advantages in performance which can be achieved by incorporating the particles and/or nano particles as part of the coating.

In a first aspect of the invention there is provided a method for the formation of a coating having oleophobic and hydrophilic properties, said method comprising the steps of:
  preparing a polymer or mixed polymer solution;
  preparing a surfactant or mixed surfactant solution;
  adding the surfactant or mixed surfactant solution to the polymer or mixed polymer solution to form a mixture
  applying the mixture to a surface to form the said coating thereon and
  wherein particles and/or nano-particles are dispersed in the polymer or mixed polymer solution prior to combination of the same with the surfactant or mixed surfactant solution.

In one embodiment the coating has oleophobic and hydrophilic properties.

In one embodiment the said mixture is agitated to create a precipitate which may be a solid precipitate.

In one embodiment the precipitate is dissolved in a solvent or solvent mixture to create the mixture as a complex precipitate in solution or suspension.

In one embodiment the said solution or suspension, once applied to the surface, is allowed to dry to form the said coating.

In one embodiment a predetermined loadings of particles or nanoparticles are dispersed in the polymer or mixed polymer solution.

In one embodiment the particles and nano-particles are any, or any combination of, silica, titania, zinc oxide, zirconia, indium tin oxide, inorganic materials, polymeric materials, carbon black, nanotubes, quantum dots, diamond, graphene, silsesquioxanes, clays, or variants thereof.

In one embodiment the dispersal of the particles and nano-particles is performed ultrasonically for a predetermined period of time.

In one embodiment, the surfactant or mixed surfactant solution is added to the polymer or mixed polymer solution in a dropwise manner.

In one embodiment the surfactant or mixed surfactant solution is added to the polymer or mixed polymer solution in a predetermined ratio which, in one embodiment, is a 1:4 ratio In one embodiment the mixture is agitated by shaking for a predetermined period of time to create a solid precipitate.

In one embodiment the solid precipitate is heated to drive off water.

In one embodiment the solid precipitate is filtered and then heated to drive off water.

In one embodiment the solid precipitate is washed with water and then is dried again by heating prior to dissolving the same in the solvent or solvent mixture to form a complex precipitate in solution.

In one embodiment a predetermined loading of particles or nanoparticles are dispersed in the solution or suspension mixture containing the dissolved complex precipitate. In one embodiment an increase in loading of particles or nanoparticles is used to change the said mixture from solution to a suspension.

In one embodiment the forming of the coating by the solution is achieved by any or any combination of application by dipping, solvent casting, spin coating, spraying, nebulisation or atomisation, flow coating, vapour deposition, plasma deposition, UV deposition, e-beam deposition, and/or evaporative deposition . . . .

In one embodiment the said application of the coating using dip coating provides a coating with a smoother surface such that in one embodiment the coating formed from DMF solvent produces a relatively smooth coating surface with an AFM RMS roughness in the range of 1-5 nm.

In one embodiment, the coating surface with an AFM RMS roughness in the range of 1-5 nm is prepared for use in relation to the provision of an improved coating for anti-fogging and/or self-cleaning applications.

In one embodiment, the coating which is applied comprises a mixed solvent and is used to create a coating with a relatively roughened surface effect. In one embodiment the coating is applied using spin coating. Typically, said coating comprising said mixed solvent is most effective for use when applied to an article for use in the separation of components from a fluid.

In one embodiment the coating solution is dried using solvent evaporation.

In one embodiment the coating solution is dried using solvent evaporation by vacuum.

In one embodiment the coating solution is dried using solvent evaporation by heating.

In a further aspect of the invention there is provided a coating formed using the method as hereinbefore described. In another aspect there is provided a coating having oleophobic and hydrophilic properties, wherein said coating includes particles and/or nano particles added to the coating material when in a liquid form so as to be embedded in the solid coating which is formed.

In a yet further aspect of the invention there is provided an article with a surface which includes a coating thereon formed in accordance with the method as herein described.

In one embodiment the article with the coating has many uses, including use in the separation of at least one component of a fluid and more typically, a liquid, such as for example the separation of the oil and water components from an oil and water mixture.

In one embodiment, the article with the coating acts as a base.

In one embodiment the base is a mesh such that the coaling causes one of the components of the fluid, when applied thereto, to remain on the coating surface and be subsequently removed therefrom, perhaps in a sliding or flowing movement across the said surface, and the other component to pass through the coating and hence through the mesh.

In one embodiment the material which passes through the mesh is collected in a first collection means and the component on the surface of the base is collected in a second collecting means and moves to the same in a direction which differs from the said component which passes through the mesh.

In one embodiment a further material or materials may be provided to absorb one or both of the separated fluid components. In an alternative to mesh, a cloth or other filter material could be used.

The base with the coating applied thereto in accordance with the invention can be used independently, or as part of a filtration system in which there maybe, for example, an initial, coarse filtration, a filtration using the invention and further finer filtrations of the separated materials.

In one embodiment the coating is provided as a substantially transparent coating and provides the article to which the same is applied, such as a viewing visor, with a coating which has excellent anti-fog, self-cleaning, anti-smudge and oil-water separation properties. Thus, these smooth polymer-fluorosurfactant complex film surfaces are found to exhibit fast oleophobic-hydrophilic switching behaviour. Equilibration of high oil contact angle (hexadecane=80°) and low water contact angle (<10°) values occurs within 10 s of droplet impact. These optically transparent surfaces display excellent anti-fogging and self-cleaning properties. The magnitude of oleophobic-hydrophilic switching can be further enhanced by the incorporation of surface roughness to an extent that it reaches a sufficiently high level (water contact angle <10° and hexadecane contact angle >110°) which, when combined with the ultra-fast switching speed, yields oil-water mixture separation efficiencies exceeding 98%.

The coating formed in accordance with the invention also exhibits improvements in durability, including mechanical durability, improved anti-bacterial qualities, improved anti-fouling qualities and low-drag.

Specific embodiments of the invention are now described; wherein.

Figure 1:
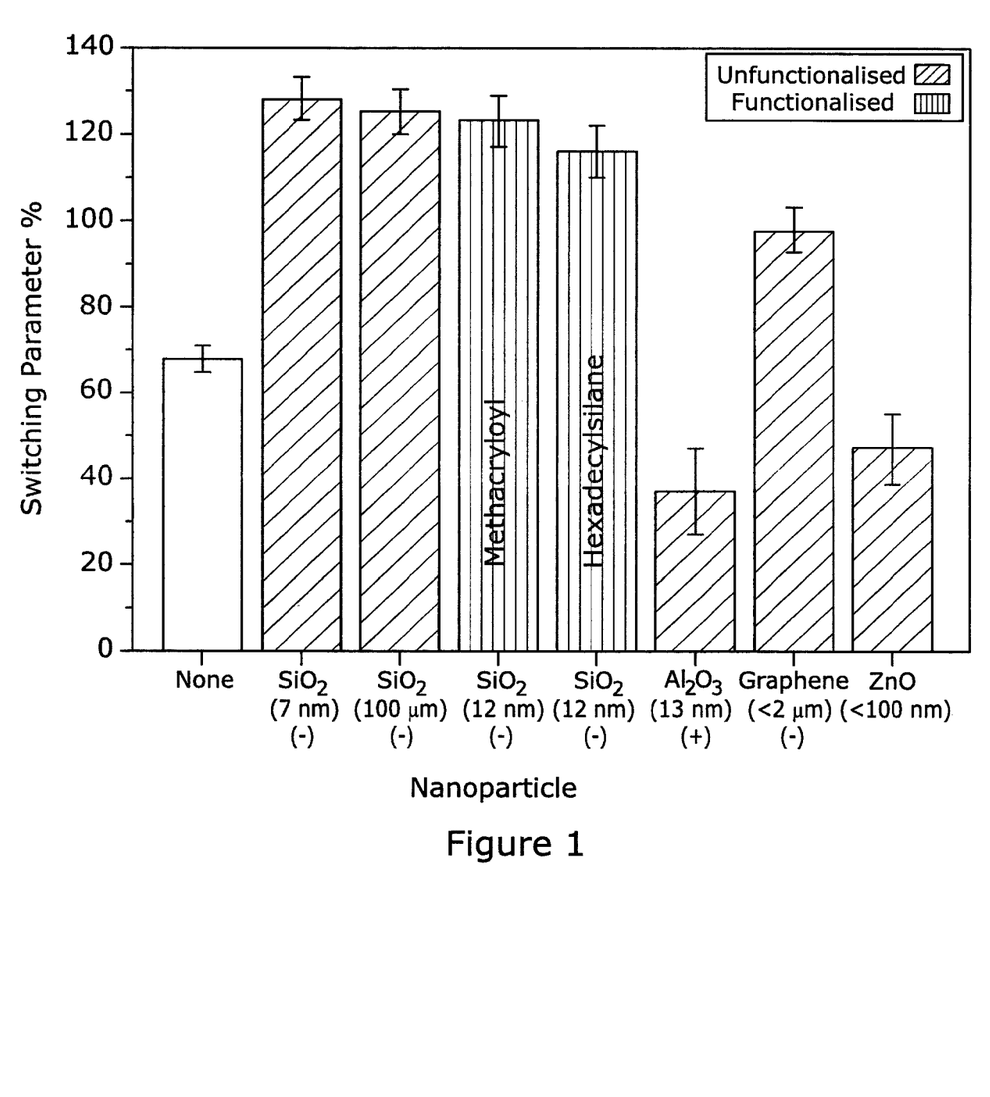
FIG. 1 illustrates graphically the switching parameters for several coatings formed in accordance with embodiments of the invention.

Oleophobic-hydrophilic switching parameters for various PDDA-particle-anionic fluorosurfactant complex coatings at 3% w/v particle loading in PDDA-particle precursor solution. Switching parameters are calculated from the difference between the hexadecane and water static contact angles (after 10 s).

In accordance with the invention the aim is to provide a coating which includes particles and/or nano-particles therein and which can be formed using a method which is improved in terms of reliability and practical application, thereby allowing the same to be commercially implementable.

In addition to the method used, it is also necessary to select the materials which are used in the method steps. For example, in preferred embodiments, the unfunctionalised or functionalised particles or nanoparticles that are used are silica and/or comprise colloidal metals (such as gold, platinum, palladium, copper, silver, rhodium, rhenium, nickel, and iridium) having surface positive/negative charge, and/or alloys of metals (such as platinum/iridium) having surface positive/negative charge, and/or metal non-oxides (such as titanium nitride, Group II-VI, III-V, and IV quantum dots) having surface positive/negative charge, alkaline earth metal oxides (such as beryllium oxide, magnesium oxide, calcium oxide, strontium oxide, barium oxide) having surface positive/negative charge, transition metal oxides having surface positive/negative charge, transition metals having surface positive/negative charge, lanthanide metal oxides (such as lanthanum oxide, neodymium oxide) having surface positive/negative charge and/or ceramics (such as titanium oxide, zirconium oxide, aluminium oxide, iron oxide, tungsten oxide, cerium oxide, antimony oxide, silicon oxide) having surface positive/negative charge, silsesquioxanes, diamond, titania, zinc oxide, zirconia, indium tin oxide, inorganic materials, silicates, aluminosilicates or polymeric materials. Other variants can include unfunctionalised or functionalised layer materials (such as graphenes, clays, micas, transition-metal dichalcogenides) with surface positive/negative charge.

With regard to the polymer, cationic polymers with the positive charge are selected to be water-soluble and comprise a monomer selected from the group consisting of allylamine, ethyleneimine, quaternary ammonium polymers, polyalkylammonium polymers, polyalkyleneimine based polymers, diallyl dialkyl ammonium salts (e.g. diallyl dimethyl ammonium chloride), dialkylaminoalkyl acrylate (e.g. dimethylaminoethyl acrylate), dialkylaminoalkyl methacrylate (e.g dimethylaminoethyl methacrylate), dialkylaminoalkyl acrylamide (e.g. dimethylaminopropyl acrylamide), dialkylaminoalkyl methacrylamide (e.g. dimethylaminopropyl methacrylamide), dimethylaminoethylaminopropylmethacrylamide methosulfate, methylacrylamide, acrylamidoalkyl trialkylammonium salts (e.g. methacrylamido propyl trimethyl ammonium chloride), N-vinylformamide, N-vinylacetamide, propyleneimine, quaternary ammonium salts of substituted acrylamide, quaternised alkyl amino acrylate esters and amides, acryloyloxyalkyl trialkylammonium salts (e.g. methacryloyloxyethyl trimethylammonium chloride), acrylamidoalkyl trialkylammonium salts (e.g. acrylamidopropyl trimethylammonium chloride), vinylpyridinium salts, quaternised vinylimidazole polymers, 1-vinylimidazolium salts, 2-vinylimidazolium salts, 4-vinylimidazolium salts, 2-vinyl N-alkyl quaternary pyridinium salts, 2-vinyl pyridinium salts, 3-vinyl pyridinium salts, 4-vinyl pyridinium salts, 2-vinyl N-alkyl pyridinium salts, 3-vinyl N-alkyl pyridinium salts, 4-vinyl N-alkyl pyridinium salts, 2-vinylbenzyltrialkylammonium salts, 3-vinylbenzyltrialkylammonium salts, 4-vinylbenzyltrialkylammonium salts, 1-vinyl piperidinium salts, 2-vinyl piperidinium salts, 3-vinyl piperidinium salts, 4-vinyl piperidinium salts, 3-alkyl 1-vinyl imidazolium salts, 2-vinylpyrazine, and copolymers thereof, or is a water-soluble polymer selected from the group consisting of chitosan, chitosan derivatives bearing cationic groups, guar derivatives bearing cationic groups, a polysaccharide bearing cationic groups, and combinations thereof.

Typically the anionic polymer with the negative charge is selected to be water-soluble and comprises a monomer selected from the group consisting of acrylic acid, aspartic acid, allylsulfonic acid, allylphosphonic acid, acrylamidoalkyl alkylphosphonic acid (e.g. acrylamidomethylpropanephosphonic acid), acrylamido alkylsulfonic salts (e.g. 2-acrylamido propane sulfonic salt), citraconic acid, fumaric acid, glutamic acid, itaconic acid, itaconic anhydride, maleic acid, maleic anhydride, methacrylic acid, dime thylacrylic acid, ethylacrylic acid, mesaconic acid, methylenemalonic acid, methallylsulfonic acid, methylmalonic anhydride, styrenesulfonic acid, 3-sulfopropyl acrylate, 3-sulfopropyl methacrylate, vinylacetic acid, vinylsulfonic acid, vinylalcohol, vinyl phosphonic acid, vinyl sulfate, and copolymers thereof.

In addition or alternatively amphoteric polymers which contain positive and negative charges, such as amphoteric polyacrylamide, and acrylic amphoteric polymers (see U.S. Pat. No. 5,011,898) could be used.

With respect to surfactants used, the surfactant can be cationic, anionic, amphoteric, or zwitterionic.

With respect to surfactants used, the tail groups of some or all can be low surface energy including fluoro-substituted and/or branched and/or siloxane.

With respect to surfactants used, the cationic surfactant which is used can be selected from those that comprise ammonium compounds such as those available under the Trade Names Chemguard S-106A, Fluowet 3658, Fluowet NMQ, and the like. Alternatively cationic surfactants based on a cyclic amine or imine, eg. cationic surfactants containing pyridinium groups, imidazolinium groups, piperidinium groups, oxazolinium groups or pyrimidinium groups are also suitable for use. Alternatively, metallosurfactants are also suitable for use.

The Anionic surfactant used preferably includes phosphates such as those sold under the trade name DuPont Capstone FS-63. The anionic surfactant may also comprise carboxylates, such as those sold under the tradename DIC MEGAFACE F-410, and/or may comprise sulfosuccinates such as those sold under the tradename Dow Triton GR-5M and/or may comprise sulfates such as those sold under the trade name Dow Triton W-30 and/or may comprise sulfonates such as those sold under the trade name Chemguard S-103A and/or comprise phosphate esters such as those sold under the trade names Chemguard S-760P, Chemguard S-761P, Chemguard S-764P and/or may comprise carboxylic acids such as perfluorooctanoic acid, perfluorononanoic acid, perfluorodecanoic acid, perfluoroundecanoic acid, perfluorododecanoic acid, perfluorotridecanoic acid, perfluorotetradecanoic acid, and the like.

Further suitable anionic surfactants include sulfated fatty acid alkanolamines, α-sulfofatty acid esters or fatty acid mono-glycerides. Other suitable anionic surfactants are fatty acid esters or fatty acid sarcosides, fatty acid glycolates, fatty acid lactates, fatty acid taurides or fatty acid isothionates.

The anionic surfactants may also be present in the form of sodium salts, potassium salts or ammonium salts or as soluble salts of organic bases such as mono-, di- or triethanolamine or other substituted amines and/or may include the alkali metal salts of the natural fatty acids.

In one embodiment the amphoteric surfactant used can comprise amine-oxides such as those sold under the trade name DuPont Capstone FS-51, Fluowet OX, Chemguard S-111, and/or comprises betaines such as those sold under the trade name DuPont Capstone FS-50 and/or amphoteric surfactant comprising sulfobetaines such as those sold under the trade name Fluowet SA.

In order to allow a comparison of the invention a method was performed to form a coating without particles/nano-particles being added and a method in accordance with the invention including the addition of particles/nano-particles was performed.

In both the method using the conventional non-particle/nano-particle approach and the method in accordance with the invention, the materials used were a Polymer in the form of poly(diallyldimethylammonium chloride) and a fluoro-surfactant in the form of Anionic DuPont Capstone FS-63

(19 mN/m at 0.1% A.I.) or Amphoteric DuPont Capstone FS-50 (15.5 mN/m at 0.1% A.I.).

In the method of the invention the nano particles added were silica nano particles in the form of Degussa Aerosil 300 (particle size=7 nm, negatively charged)

A separate polymer solution was used in the form of a 2% w/v polymer solution in water and a 5% v/v fluorosurfactant solution in water formed the separate fluorosurfactant solution.

In the method without the use of nano-particles the following steps were used:

The fluorosurfactant solution was added dropwise to the polymer solution in a 1:4 ratio, and the mixture was shaken for 1 hour to make a solid precipitate.

2. The resulting polymer-fluorosurfactant complex precipitate in solution was then placed on a hotplate set at 110° C. to drive off water.

3. Then the remaining polymer-fluorosurfactant complex precipitate was washed with water before being dried again on a hotplate set at 110° C.

4. The precipitate was then dissolved in a solvent or solvent mixture (for example ethanol to make a 1% w/v solution).

5. This solution was then used to form the coating by for example dipping, solvent casting, spin coating, spraying, nebulisation or atomisation.

6. The coating was allowed to dry through solvent evaporation.

In the method including the use of nano-particles the following method steps were used:

1. Various loadings of particles or nanoparticles (for example silica nanoparticles, graphene, clays, silsesquioxanes or variants thereof) were ultrasonically dispersed in the polymer solution for 1 hour.

2. The fluorosurfactant solution was added dropwise to the polymer solution containing particles or nanoparticles in a 1:4 ratio, and the mixture was shaken for 1 hour to make a solid precipitate.

3. The resulting polymer-particle/nano-particle-fluorosurfactant complex precipitate in solution was then placed on a hotplate set at 110° C. to drive off water.

4. Then the remaining polymer-fluorosurfactant-particle/nanoparticle complex precipitate was washed with water before being dried again on a hotplate set at 110° C.

5. The precipitate was then dissolved in a solvent or solvent mixture (for example ethanol to make a 1% w/v solution).

6. This solution is then used to form the coating by for example dipping, solvent casting, spin coating, nebulisation, spraying, or atomisation.

7. The coating was allowed to dry through solvent evaporation.

The following tables 1 and 2 set out the results achieved for coatings formed using the two methods and illustrate the clear and significant advantages obtained in terms of the oleophobic and hydrophilic characteristics and improved switching parameter value (the difference in measured static contact angle between oil and water droplets) obtained by using the coating including nano-particles.

TABLE 1

| Capstone FS-50<br>Amphoteric | Water<br>1 μL<br>t = 10 s/° | Hexadecane<br>1 μL<br>t = 10 s/° | Switching<br>Parameter<br>t = 10 s/° |
|---|---|---|---|
| Poly(diallyldimethylammonium chloride) + Capstone FS-50 | 19 ± 6 | 86 ± 2 | 67 |
| Poly(diallyldimethylammonium chloride) + Capstone FS-50 + SiO$_2$ nanoparticles | <10 | 142 ± 3 | 132 |

TABLE 2

| Capstone FS-63<br>Anionic | Water 1 μL<br>t = 10 s/° | Hexadecane<br>1 μL<br>t = 10 s/° | Switching<br>Parameter<br>t = 10 s/° |
|---|---|---|---|
| Poly(diallyldimethylammonium chloride) + Capstone FS-63 | 20 ± 6 | 93 ± 3 | 73 |
| Poly(diallyldimethylammonium chloride) + Capstone FS-63 + SiO$_2$ nanoparticles | 10 ± 1 | 140 ± 7 | 130 |

In one example in accordance with the invention, Poly (diallyldimethylammonium chloride) (PDDR; manufactured by Sigma-Aldrich Ltd.) was used as the polymer and an Anionic fluorosurfactant (Capstone FS-63, DuPont Ltd.) or amphoteric fluorosurfactant (Capstone FS-50, DuPont Ltd.) were used and the results are detailed below in which the particles tested are detailed in Table 3.

Details of the particles used.

| Particle | Supplier | Average Particle Size | Surface Charge |
|---|---|---|---|
| SiO$_2$ | Degussa Aerosil ® 300 | 7 nm | Negative |
| SiO$_2$ | Crosfield Catalysts | 100 μm | Negative |
| SiO$_2$, methacryloyl functionalised | Degussa Aerosil ® R711 | 12 nm (100-200 nm average aggregate size) | Negative |
| SiO$_2$, hexadecylsilane functionalised | Degussa Aerosil ® R816 | 12 nm | Negative |
| Al$_2$O$_3$ | Degussa Aluminiumoxid C | 13 nm | Positive |
| Graphene | Strem Chemicals | <2 μm | Negative |
| ZnO | Sigma Aldrich Ltd. | <100 nm | Positive |

In order to test the switching parameter which was obtained the following results were achieved as indicated below in tables 4.1-4.4

TABLE 4.1

Water and hexadecane static contact angles for glass slide substrates spray coated with PDDA-FS-63/SiO2.

| SiO$_2$ content/ w/v | Water 1 μL (t = 10 s)/° | Hexadecane 1 μL/° | Switching parameter (t = 10 s)/° |
|---|---|---|---|
| 0% | 22 ± 2 | 90 ± 2 | 68 |
| 3.0% | <10 | 138 ± 5 | 128 |
| 4.0% | <10 | 135 ± 3 | 125 |

TABLE 4.2

Water and hexadecane static contact angles for glass slide substrates coated by solvent casting with PDDA-FS-63/SiO2.

| SiO$_2$ content/ w/v | Water 1 μL (t = 10 s)/° | Hexadecane 1 μL/° | Switching parameter (t = 10 s)/° |
|---|---|---|---|
| 0% | 20 ± 6 | 93 ± 3 | 73 |
| 2.0% | 16 ± 3 | 142 ± 4 | 126 |

TABLE 4.3

Water and hexadecane static contact angles for glass slide substrates spray coated with PDDA-FS-50/SiO2.

| SiO$_2$ content/ w/v | Water 1 μL (t = 10 s)/° | Hexadecane 1 μL/° | Switching parameter (t = 10 s)/° |
|---|---|---|---|
| 0% | 14 ± 1 | 82 ± 1 | 68 |
| 1.5% | 12 ± 2 | 131 ± 5 | 119 |

TABLE 4.4

Water and hexadecane static contact angles for glass slide substrates coated by solvent casting with PDDA-FS-50/SiO2.

| SiO$_2$ content/ w/v | Water 1 μL (t = 10 s)/° | Hexadecane 1 μL/° | Switching parameter (t = 10 s)/° |
|---|---|---|---|
| 0% | 19 ± 10 | 80 ± 1 | 61 |
| 1.5% | <10 | 142 ± 3 | 132 |

With regard to the accompanying Figures, FIG. 1 illustrates Oleophobic-hydrophilic switching parameters for various PDDA-particle-anionic fluorosurfactant complex coatings at 3% w/v particle loading in PDDA-particle precursor solution. Switching parameters are calculated from the difference between the hexadecane and water static contact angles (after 10 s). It will be seen that the switching parameter value/° is significantly increased when the particles/nanoparticles are present in comparison to the value when no particles are present, as indicated by the column with the heading None.

Figure 2:
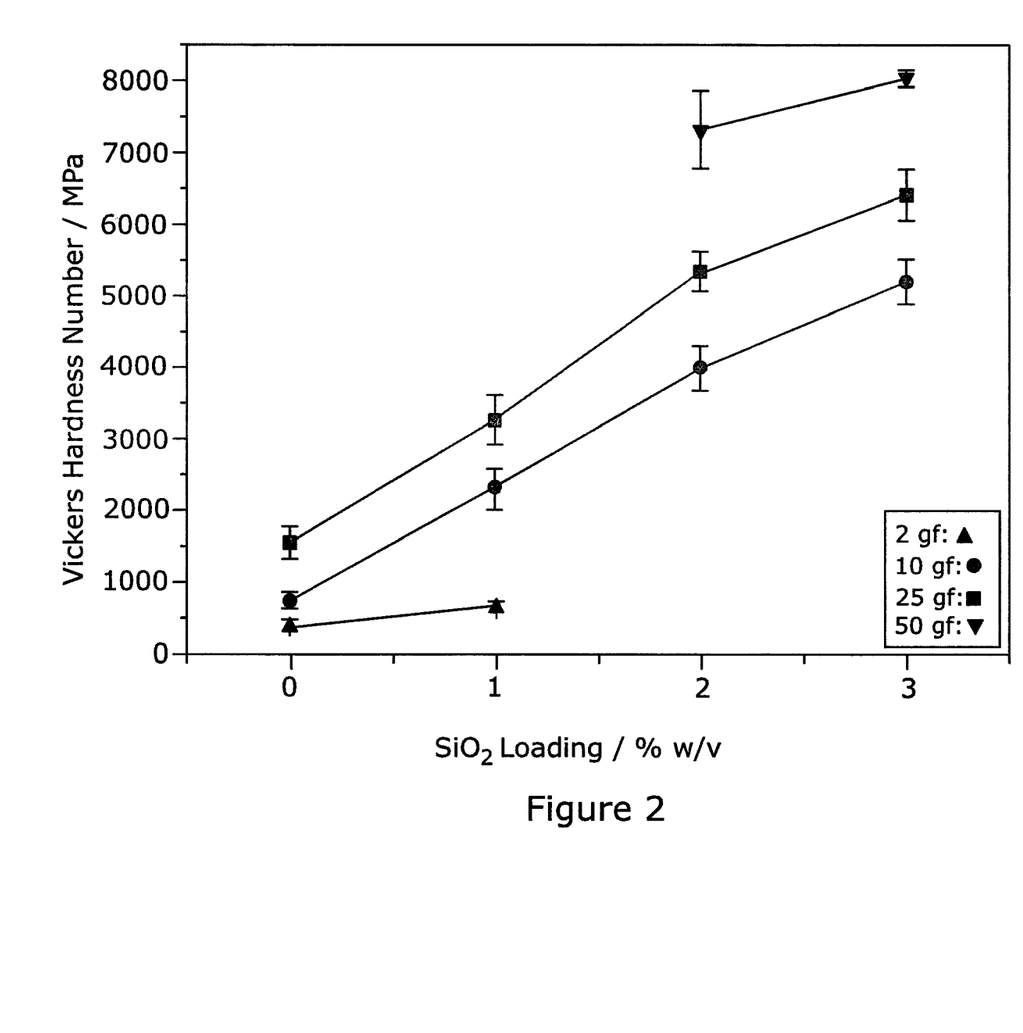
FIG. 2 illustrates graphically the Vickers hardness number measured for various forces in relation to a coating formed in accordance with one embodiment of the invention.

FIG. 2 illustrates graphically the Vickers hardness numbers which are measured for various forces as a function of a 7 nm SiO$_2$ particle loading concentration for a PDDA-SiO$_2$-anionic fluorosurfactant which has been applied by spray coating onto silicon wafer substrates. Micro-indentation measurements show that, for a given indentation force, the hardness of the coating increases with the increased loading of silica nanoparticles in the coating which has been applied.

Figure 3:
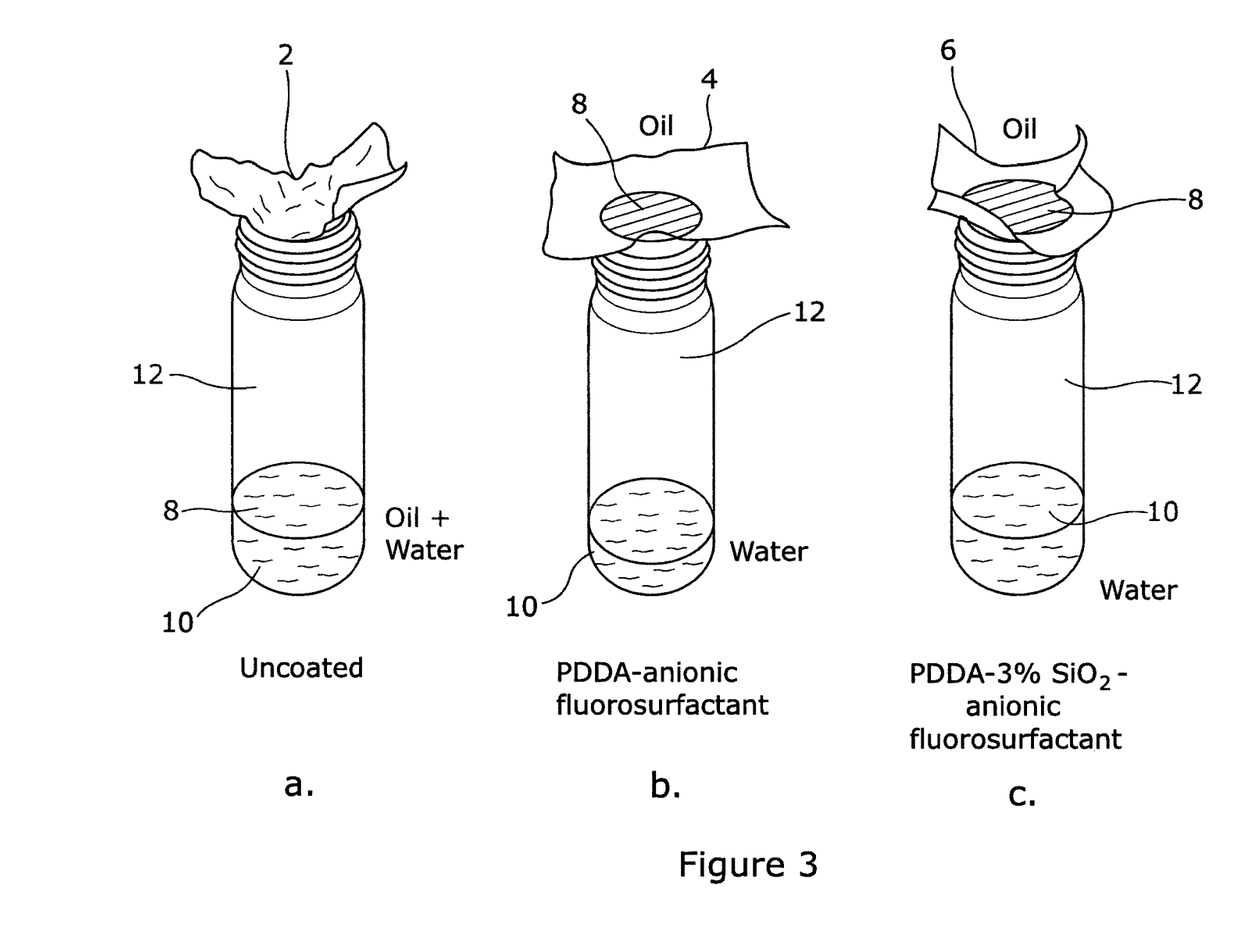
FIG. 3 illustrates oil-water separation performance of different mesh formations.

FIG. 3 illustrates in the respective photographs which shows apparatus in accordance with one embodiment of the invention and in a schematic test format for ease of illustration. As shown in FIGS. 3a-c there are provided three articles 2, 4, 6 in the form of a mesh filter. In photograph a. the mesh 2 is an uncoated metal mesh, in photograph b there is provided the same metal mesh 4 but this time at least the upper surface is coated with PDDA-anionic fluorosurfactant complex coating and in Figure c. there is provided the same metal mesh structure 6 and, in accordance with the invention, the mesh is coated with PDDA-3% SiO2 (7 nm)-anionic fluorosurfactant complex coating (coating includes particles). In all cases the same oil-water mixture was poured into the top surface 16 of the mesh and in photograph a. it is seen how the mixture passes through the mesh so that both oil 8 and water 10 are collected in the collecting jar 12. However with both the PDDA-anionic fluorosurfactant complex coating of Photograph b. and the PDDA-3% SiO2-anionic fluorosurfactant coating of photograph c. there is caused separation of the oil 8 and water 10 by the coated mesh 4,6 respectively, with the oil 8 being retained on the top surface of the mesh and only the water 10 collecting in the jar 12. Thus, relatively high-purity water 10 passes through the coated meshes of photographs b and c, whilst oil (hexadecane) 8 is retained on the surface of the mesh 4,6 on which the mixture contacts so providing proof that mesh coated with a coating in accordance with the invention can be used to separate oil 8 from water 10.

Figure 4:
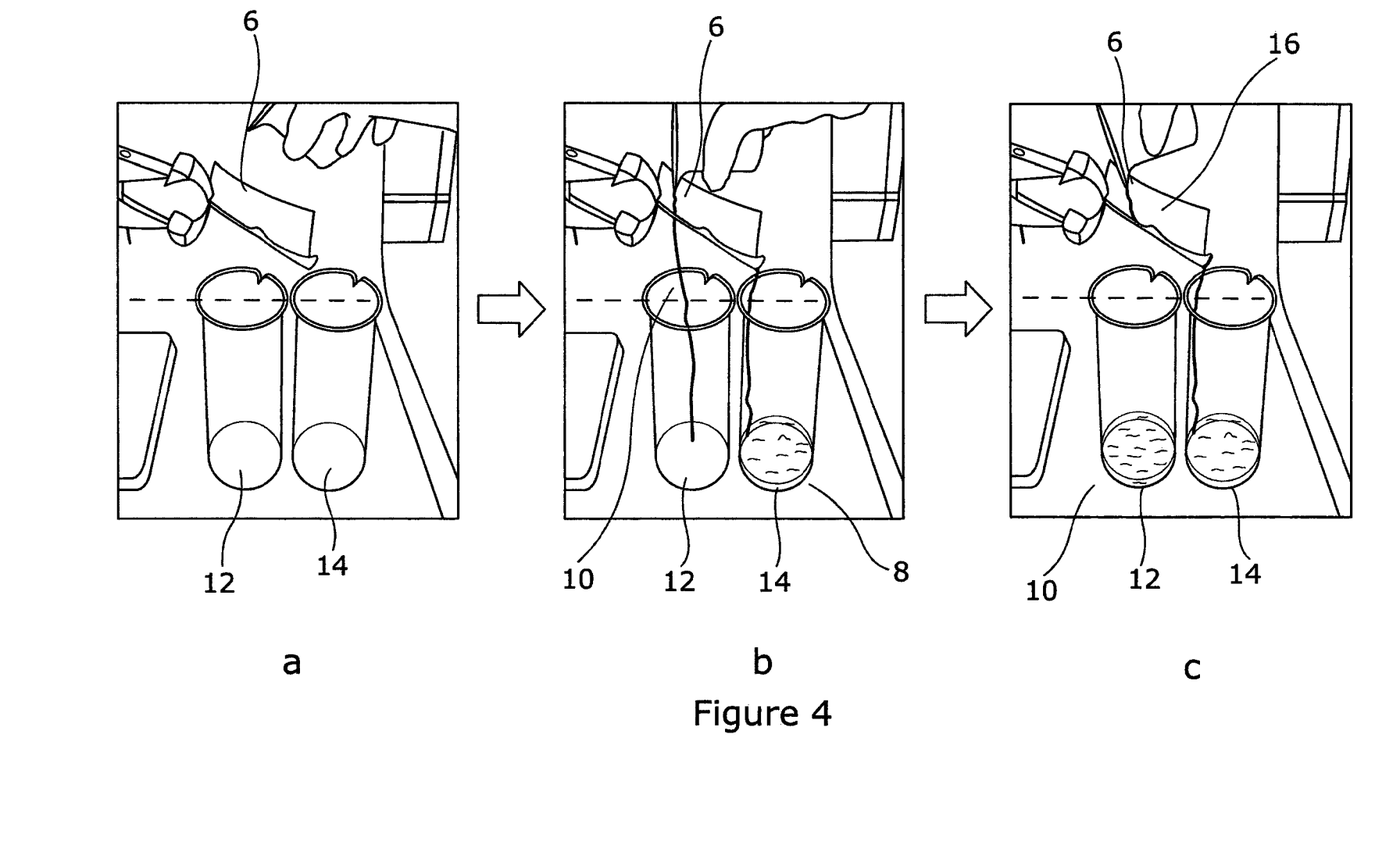
FIG. 4 illustrates the separation of an oil-water mixture using a PDDA-3% SiO2 (7 nm)-anionic fluorosurfactant coated mesh in accordance with the invention.

Thus, by inclining the coated mesh 6 of photograph c of FIG. 3 above two collecting jars 12, 14 as shown in FIGS. 4a-c, an oil-water mixture can be separated with oil 8 passing into one collecting jar 14 from the top surface 16 of the mesh 6 in accordance with the invention and water 10 passing into the other collecting jar 12 by passing though the mesh as shown progressively in the photographs a-c of FIG. 4 in which the separation of the oil-water mixture using the mesh with the PDDA-3% SiO2 (7 nm)-anionic fluorosurfactant coating is shown being performed.

The invention claimed is:

1. A method for the formation of a coating having oleophobic and hydrophilic properties, said method comprising the steps of:
   preparing a polymer or mixed polymer solution;
   preparing a surfactant or mixed surfactant solution;
   adding the surfactant or mixed surfactant solution to the polymer or mixed polymer solution to form a mixture
   applying the mixture to a surface to form the said coating thereon and
   wherein particles and/or nano-particles are dispersed in the polymer or mixed polymer solution prior to combination of the same with the surfactant or mixed surfactant solution.

2. The method according to claim 1 wherein the said mixture is agitated to create a precipitate.

3. The method according to claim 2 wherein the precipitate is a solid precipitate.

4. The method according to claim 3 wherein the precipitate is dissolved in a solvent or solvent mixture to create a complex precipitate in solution or suspension.

5. The method according to claim 4, wherein the said solution or suspension, once applied to a surface, is allowed to form the said coating.

6. The method according to claim 1 wherein an increase in loading of particles or nano-particles is used to change the said mixture from solution to a suspension.

7. The method according to claim 1 wherein the particles and nano-particles are any, or any combination of, silica, titania, zinc oxide, zirconia, indium tin oxide, inorganic materials, polymeric materials, carbon black, nanotubes, quantum dots, diamond, graphene, silesquioxanes, or clays.

8. The method according to claim 1 wherein the dispersal of the particles and nano-particles is performed ultrasonically for 1 hour.

9. The method according to claim 1 wherein the surfactant or mixed surfactant solution is added to the polymer or mixed polymer solution in a dropwise manner.

10. The method according to claim 1 wherein the surfactant or mixed surfactant solution is added to the polymer or mixed polymer solution in a ratio of 1:4.

11. The method according to claim 3 wherein the solid precipitate is heated to drive off water.

12. The method according to claim 11 wherein after heating the solid precipitate is washed with water and then is dried again by heating prior to dissolving the same in a solvent or solvent mixture to form a complex precipitate in solution.

13. The method according to claim 4 wherein a loading of particles or nanoparticles are dispersed in the solution or suspension containing the dissolved complex precipitate.

14. The method according to claim 6 wherein the forming of the coating by the solution or suspension is achieved by any or any combination of application by dipping, solvent casting, spin coating, spraying, nubulisation or atomisation, flow coating, vapour deposition, plasma deposition, UV deposition, e-beam deposition, and/or evaporative deposition.

15. The method according to claim 1 wherein the mixture further includes a mixed solvent.

16. A coating formed from the method according to claim 1.

* * * * *